US007955750B2

(12) United States Patent
Leistra et al.

(10) Patent No.: US 7,955,750 B2
(45) Date of Patent: Jun. 7, 2011

(54) CONTROLLED ELECTRODE OVERLAP ARCHITECTURE FOR IMPROVED MEA DURABILITY

(75) Inventors: James Leistra, Penfield, NY (US); Ronald L. James, North Chili, NY (US); David Dobulis, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1508 days.

(21) Appl. No.: 11/358,670

(22) Filed: Feb. 21, 2006

(65) Prior Publication Data
US 2007/0196718 A1 Aug. 23, 2007

(51) Int. Cl.
*H01M 2/08* (2006.01)
*H01M 2/14* (2006.01)
*H01M 2/20* (2006.01)
*H01M 8/10* (2006.01)
*H01M 8/24* (2006.01)

(52) U.S. Cl. ........ 429/508; 429/469; 429/479; 429/483; 429/507; 429/509

(58) Field of Classification Search ...................... 429/40
See application file for complete search history.

(56) References Cited

U.S. PATENT DOCUMENTS

| 3,985,578 | A | 10/1976 | Witherspoon et al. |
| 5,272,017 | A | 12/1993 | Swathirajan et al. |
| 5,464,700 | A | 11/1995 | Steck et al. |
| 5,624,769 | A | 4/1997 | Li et al. |
| 5,776,624 | A | 7/1998 | Neutzler |
| 6,103,409 | A | 8/2000 | DiPierno Bosco et al. |
| 6,277,513 | B1 | 8/2001 | Swathirajan et al. |
| 6,350,539 | B1 | 2/2002 | Wood, III et al. |
| 6,372,376 | B1 | 4/2002 | Fronk et al. |
| 6,376,111 | B1 | 4/2002 | Mathias et al. |
| 6,521,381 | B1 | 2/2003 | Vyas et al. |
| 6,524,736 | B1 | 2/2003 | Sompalli et al. |
| 6,528,191 | B1 | 3/2003 | Senner |
| 6,566,004 | B1 | 5/2003 | Fly et al. |
| 6,630,260 | B2 | 10/2003 | Forte et al. |
| 6,663,994 | B1 | 12/2003 | Fly et al. |
| 6,740,433 | B2 | 5/2004 | Senner |
| 6,777,120 | B2 | 8/2004 | Nelson et al. |
| 6,793,544 | B2 | 9/2004 | Brady et al. |
| 6,794,068 | B2 | 9/2004 | Rapaport |
| 6,811,918 | B2 | 11/2004 | Blunk et al. |
| 6,824,909 | B2 | 11/2004 | Mathias et al. |
| 2003/0049518 | A1* | 3/2003 | Nanaumi et al. ................. 429/44 |
| 2003/0221311 | A1* | 12/2003 | Smith et al. ................... 29/623.2 |
| 2004/0027277 | A1 | 2/2004 | Diggelen et al. |

(Continued)

*Primary Examiner* — Basia Ridley
*Assistant Examiner* — Sean P Cullen
(74) *Attorney, Agent, or Firm* — John A. Miller; Miller IP Group, PLC

(57) ABSTRACT

A membrane electrode assembly includes a membrane layer, a cathode or anode catalyst layer adjacent to a surface of the membrane layer, an anode or cathode catalyst layer adjacent to an other surface of the membrane layer, an adhesive layer adjacent to the other surface of the membrane layer, wherein the adhesive layer abuts a surface of the anode or cathode catalyst layer, and a subgasket layer having an edge portion, wherein the subgasket layer is adjacent to a surface of the adhesive layer, wherein the cathode catalyst layer and anode catalyst layer extend along a length of the membrane layer relative to the edge portion of the subgasket layer, wherein the cathode or anode catalyst layer extends a greater length along the length of the membrane layer than the anode or cathode catalyst layer relative to the edge portion of the subgasket layer.

16 Claims, 5 Drawing Sheets

U.S. PATENT DOCUMENTS

| | | |
|---|---|---|
| 2004/0229087 A1 | 11/2004 | Senner et al. |
| 2005/0026012 A1 | 2/2005 | O'Hara |
| 2005/0026018 A1 | 2/2005 | O'Hara et al. |
| 2005/0026523 A1 | 2/2005 | O'Hara et al. |
| 2005/0142397 A1* | 6/2005 | Wakahoi et al. ............ 429/12 |
| 2005/0271929 A1* | 12/2005 | Sompalli et al. ............ 429/40 |
| 2007/0042254 A1* | 2/2007 | Wozniczka et al. .......... 429/35 |
| 2007/0215461 A1 | 9/2007 | Zuber et al. |

* cited by examiner

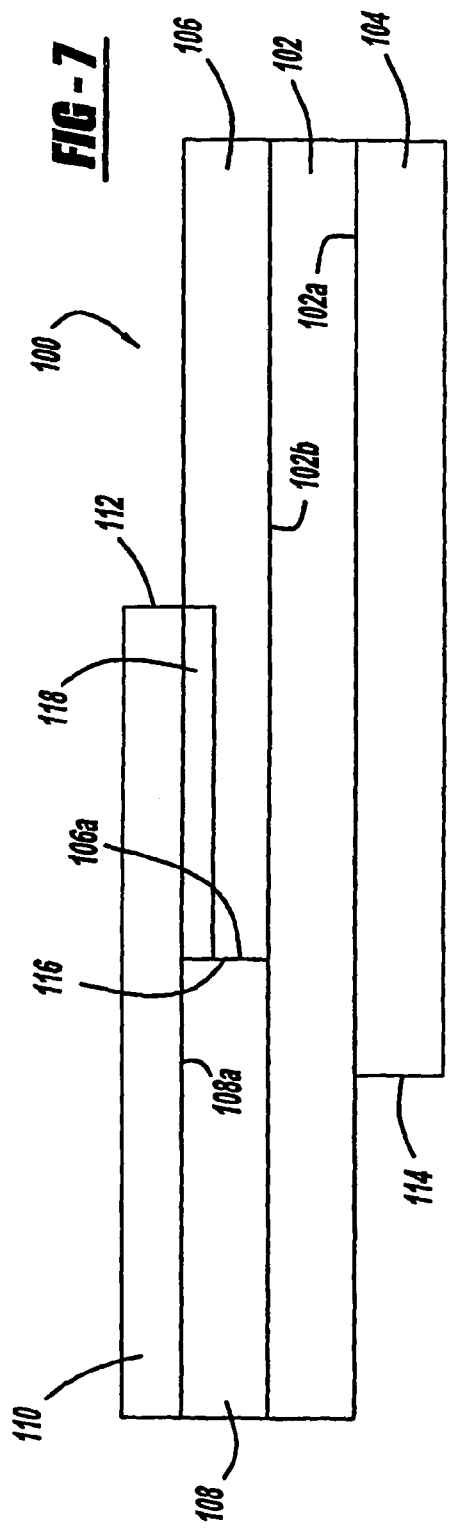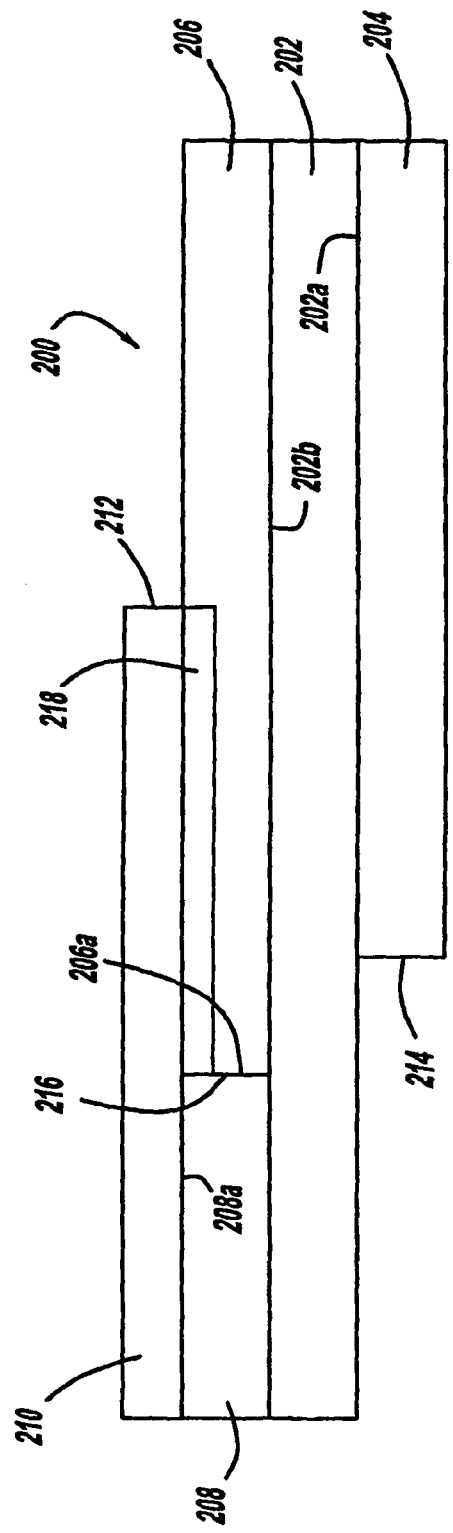

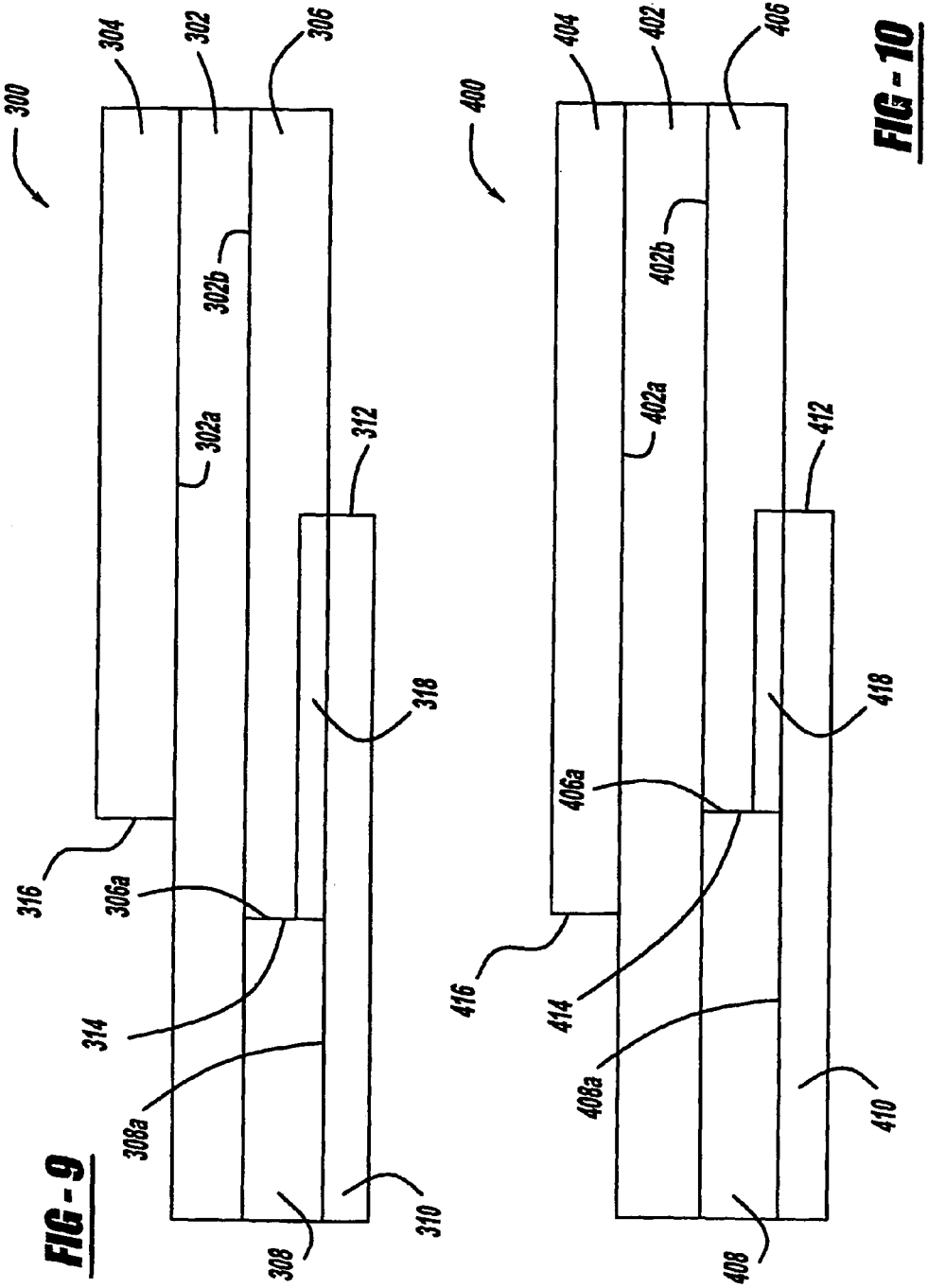

CONTROLLED ELECTRODE OVERLAP ARCHITECTURE FOR IMPROVED MEA DURABILITY

FIELD OF THE INVENTION

The present invention relates generally to fuel cells, and more particularly to new and improved membrane electrode assemblies that exhibit enhanced durability.

BACKGROUND OF THE INVENTION

Fuel cells have been used as a power source in many applications. For example, fuel cells have been proposed for use in electrical vehicular power plants to replace internal combustion engines. In proton exchange membrane (PEM)-type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements, sometimes referred to as the gas diffusion media components, that: (1) serve as current collectors for the anode and cathode; (2) contain appropriate openings therein for distributing the fuel cell's gaseous reactants over the surfaces of the respective anode and cathode catalysts; (3) remove product water vapor or liquid water from electrode to flow field channels; (4) are thermally conductive for heat rejection; and (5) have mechanical strength. The term fuel cell is typically used to refer to either a single cell or a plurality of cells (e.g., a stack) depending on the context. A plurality of individual cells are commonly bundled together to form a fuel cell stack and are commonly arranged in series. Each cell within the stack comprises the MEA described earlier, and each such MEA provides its increment of voltage.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

Examples of technology related to PEM and other related types of fuel cell systems can be found with reference to commonly-assigned U.S. Pat. No. 3,985,578 to Witherspoon et al.; U.S. Pat. No. 5,272,017 to Swathirajan et al.; U.S. Pat. No. 5,624,769 to Li et al.; U.S. Pat. No. 5,776,624 to Neutzler; U.S. Pat. No. 6,103,409 to DiPierno Bosco et al.; U.S. Pat. No. 6,277,513 to Swathirajan et al.; U.S. Pat. No. 6,350,539 to Woods, III et al.; U.S. Pat. No. 6,372,376 to Fronk et al.; U.S. Pat. No. 6,376,111 to Mathias et al.; U.S. Pat. No. 6,521,381 to Vyas et al.; U.S. Pat. No. 6,524,736 to Sompalli et al.; U.S. Pat. No. 6,528,191 to Senner; U.S. Pat. No. 6,566,004 to Fly et al.; U.S. Pat. No. 6,630,260 to Forte et al.; U.S. Pat. No. 6,663,994 to Fly et al.; U.S. Pat. No. 6,740,433 to Senner; U.S. Pat. No. 6,777,120 to Nelson et al.; U.S. Pat. No. 6,793,544 to Brady et al.; U.S. Pat. No. 6,794,068 to Rapaport et al.; U.S. Pat. No. 6,811,918 to Blunk et al.; U.S. Pat. No. 6,824,909 to Mathias et al.; U.S. Patent Application Publication Nos. 2004/0229087 to Senner et al.; 2005/0026012 to O'Hara; 2005/0026018 to O'Hara et al.; and 2005/0026523 to O'Hara et al., the entire specifications of all of which are expressly incorporated herein by reference.

FIGS. 1 and 2 illustrate typical uncontrolled overlap edge design which typically fails in the edge regions, e.g., where the edge portion 10 of the anode catalyst layer 12 abuts against the edge portion 14 of the subgasket layer 16 and the edge portion 18 of the adhesive layer 20, and/or where the edge portion 22 of the cathode catalyst layer 24 abuts against the edge portion 26 of the other subgasket layer 28 and the edge portion 30 of the other adhesive layer 32. It should be noted that the anode catalyst layer 12 and the cathode catalyst layer 24 sandwich the membrane layer 34 in an overlapping, staggered or offset configuration, as shown in FIGS. 1 and 2.

This uncontrolled overlap configuration yields an anode>cathode configuration at some MEA edge locations and a cathode>anode configuration at some other MEA edge locations typically due to manufacturing tolerances during the application of the anode and cathode subgaskets to the membrane and during the electrode decal transfer process. Limitations of these particular designs include a potential gap G between the edges of the respective catalyst layers and the edges of the respective subgaskets, as shown in FIGS. 3 and 4. A gap allows direct gas access, e.g., either $O_2$ or $H_2$, to the membrane surface thereby enhancing the formation of *OH and *$HO_2$ radical species from the crossover gasses, thus leading to accelerated local chemical degradation of the polymer membrane. If the electrode is larger than the window created by the subgasket, the catalyst layer may form "tents" T over the edge of the subgasket during the catalyst application process to the membrane (typically known as decal transfer), as shown in FIGS. 5 and 6. This tenting typically leads to a catalyst crack at the edge of the subgasket and subsequent direct gas access to the membrane surface and accelerated local chemical degradation. In addition, the tenting phenomenon typically leads to some length of membrane surface, whose length is on the order of the thickness of the subgasket, with no catalyst attached to the membrane surface.

Various attempts have been made to overcome this problem. For example, some manufacturers have used hot pressure to attach the subgaskets to the ionomer membranes. In addition to the heat and pressure required in the technique, an additional disadvantage is that the catalyst layers are added after the subgasket. This prevents the subgasket from being attached over the catalyst layer. The subgasket can be attached under the catalyst in this method, but this will often lead to catalyst cracking and delaminating at the subgasket edge. This cracking results in a fuzzy catalyst edge at the subgasket edge. In order to offset the anode and cathode catalyst edges, this method requires additional space to account for the uncertainty in the catalyst edge caused by the cracking. Additionally, this method could leave gaps of exposed ionomer membrane between the catalyst and subgasket edges.

Other attempts use an approach where the subgasket is placed on top of the membrane. Then this three layer structure is sandwiched between two pieces of catalyst coated diffusion media. The entire assembly is then hot pressed past the glass transition point of the ionomer to form the MEA. While this approach is fairly robust in terms of controlling catalyst edges it has several disadvantages. First, the heat and pressure required to get the bond can cause the ionomer membrane to flow, which can lead to thinning under the subgaskets. Second, the heat/cool cycles can induce thermal stresses in the part. Failures can then occur at the subgasket edge. Third, because the entire MEA, to include the gas diffusion medium (GDM), is assembled in one hot press step, it is very difficult to then inspect the catalyst edge positions.

Accordingly, there exists a need for new and improved MEA configurations wherein the edge architecture in proximity to the subgasket and catalyst coated membrane layers provide enhanced membrane durability.

SUMMARY OF THE INVENTION

In accordance with the general teachings of the present invention, there is provided new and improved MEA edge designs and configurations for improved membrane durability.

In accordance with one embodiment of the present invention, a membrane electrode assembly is provided, comprising: (1) a membrane layer; (2) a cathode catalyst layer adjacent to a surface of the membrane layer; (3) an anode catalyst layer adjacent to an other surface of the membrane layer, wherein the membrane layer is disposed between the cathode catalyst layer and the anode catalyst layer; (4) an adhesive layer adjacent to the other surface of the membrane, wherein the adhesive layer abuts a surface of the anode catalyst layer; and (5) a subgasket layer having an edge portion, wherein the subgasket layer is adjacent to a surface of the adhesive layer, wherein the adhesive layer is disposed between the subgasket layer and the membrane layer, wherein the cathode catalyst layer and anode catalyst layer extend along a length of the membrane layer relative to the edge portion of the subgasket layer, wherein the cathode catalyst layer extends a greater length along the length of the membrane layer than the anode catalyst layer relative to the edge portion of the subgasket layer.

In accordance with a first alternative embodiment of the present invention, a membrane electrode assembly is provided, comprising: (1) a membrane layer; (2) a cathode catalyst layer adjacent to a surface of the membrane layer; (3) an anode catalyst layer adjacent to an other surface of the membrane layer, wherein the membrane layer is disposed between the cathode catalyst layer and the anode catalyst layer; (4) an adhesive layer adjacent to the other surface of the membrane, wherein the adhesive layer abuts a surface of the anode catalyst layer; and (5) a subgasket layer having an edge portion, wherein the subgasket layer is adjacent to a surface of the adhesive layer, wherein the adhesive layer is disposed between the subgasket layer and the membrane layer, wherein the cathode catalyst layer and anode catalyst layer extend along a length of the membrane layer relative to the edge portion of the subgasket layer, wherein the anode catalyst layer extends a greater length along the length of the membrane layer than the cathode catalyst layer relative to the edge portion of the subgasket layer.

In accordance with a second alternative embodiment of the present invention, a membrane electrode assembly is provided, comprising: (1) a membrane layer; (2) an anode catalyst layer adjacent to a surface of the membrane layer; (3) a cathode catalyst layer adjacent to an other surface of the membrane layer, wherein the membrane layer is disposed between the cathode catalyst layer and the anode catalyst layer; (4) an adhesive layer adjacent to the other surface of the membrane, wherein the adhesive layer abuts a surface of the cathode catalyst layer; and (5) a subgasket layer having an edge portion, wherein the subgasket layer is adjacent to a surface of the adhesive layer, wherein the adhesive layer is disposed between the subgasket layer and the membrane layer, wherein the cathode catalyst layer and anode catalyst layer extend along a length of the membrane layer relative to the edge portion of the subgasket layer, wherein the cathode catalyst layer extends a greater length along the length of the membrane layer than the anode catalyst layer relative to the edge portion of the subgasket layer.

In accordance with a third alternative embodiment of the present invention, a membrane electrode assembly is provided, comprising: (1) a membrane layer; (2) an anode catalyst layer adjacent to a surface of the membrane layer; (3) a cathode catalyst layer adjacent to an other surface of the membrane layer, wherein the membrane layer is disposed between the cathode catalyst layer and the anode catalyst layer; (4) an adhesive layer adjacent to the other surface of the membrane, wherein the adhesive layer abuts a surface of the cathode catalyst layer; and (5) a subgasket layer having an edge portion, wherein the subgasket layer is adjacent to a surface of the adhesive layer, wherein the adhesive layer is disposed between the subgasket layer and the membrane layer, wherein the cathode catalyst layer and anode catalyst layer extend along a length of the membrane layer relative to the edge portion of the subgasket layer, wherein the anode catalyst layer extends a greater length along the length of the membrane layer than the cathode catalyst layer relative to the edge portion of the subgasket layer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a schematic view of an MEA having a locally greater cathode catalyst layer area than the anode catalyst layer area, wherein a subgasket is overlapping the anode catalyst layer and an adhesive layer is disposed between the subgasket and the anode catalyst layer, in accordance with a first embodiment of the present invention;

FIG. 8 is a schematic view of an MEA having a locally greater anode catalyst layer area than the cathode catalyst layer area, wherein a subgasket is overlapping the anode catalyst layer and an adhesive layer is disposed between the subgasket and the anode catalyst layer, in accordance with a second embodiment of the present invention;

FIG. 9 is a schematic view of an MEA having a locally greater cathode catalyst layer area than the anode catalyst layer area, wherein a subgasket is overlapping the cathode catalyst layer and an adhesive layer is disposed between the subgasket and the cathode catalyst layer, in accordance with a third embodiment of the present invention; and FIG. 10 is a schematic view of an MEA having a locally greater anode catalyst layer area than the cathode catalyst layer area, wherein a subgasket is overlapping the cathode catalyst layer and an adhesive layer is disposed between the subgasket and the cathode catalyst layer, in accordance with a fourth embodiment of the present invention.

DETAILED DESCRIPTION OF THE PREFERRED EMBODIMENTS

Figure 1:
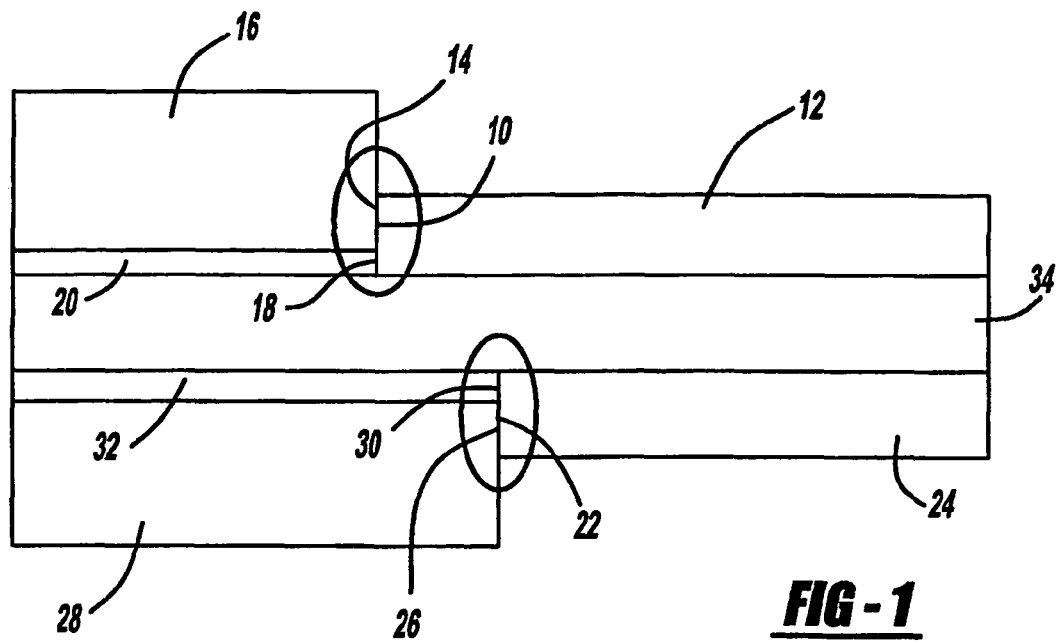
FIG. 1 is a schematic view of a first conventional MEA, in accordance with the prior art.
Figure 2:
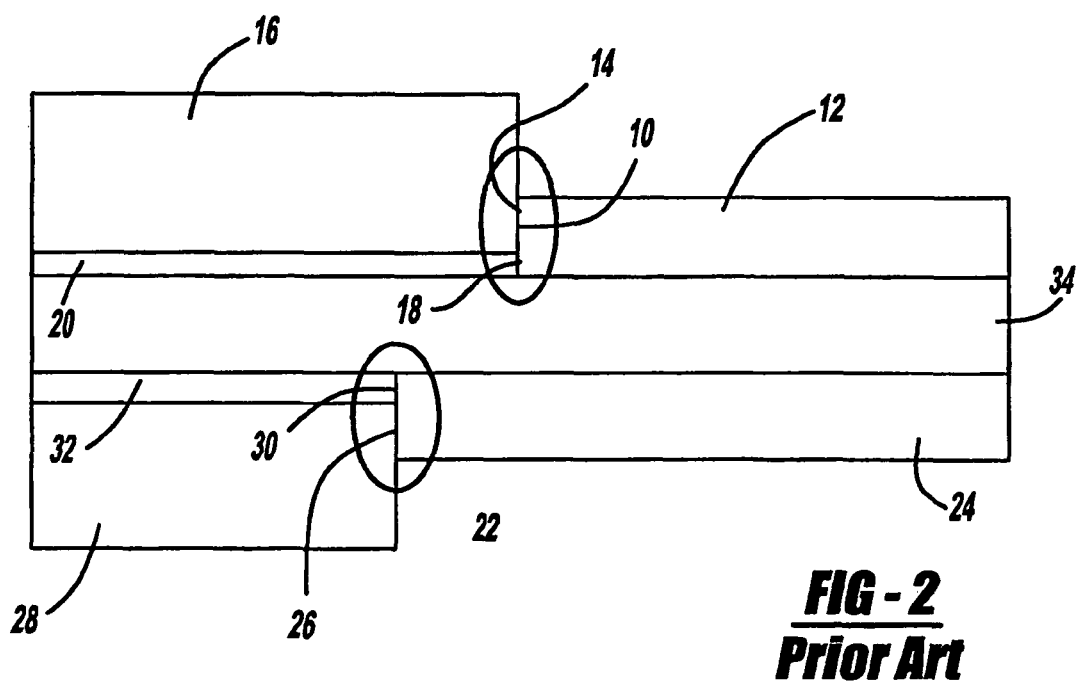
FIG. 2 is a schematic view of a second conventional MEA, in accordance with the prior art.
Figure 3:
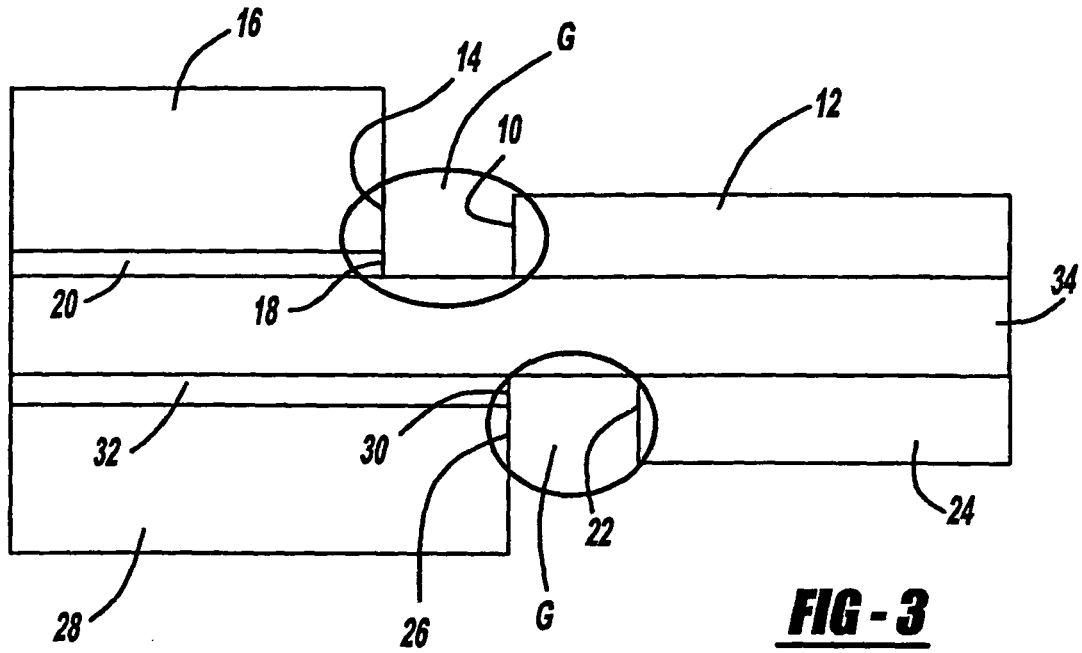
FIG. 3 is a schematic view of a third conventional MEA, in accordance with the prior art.
Figure 4:
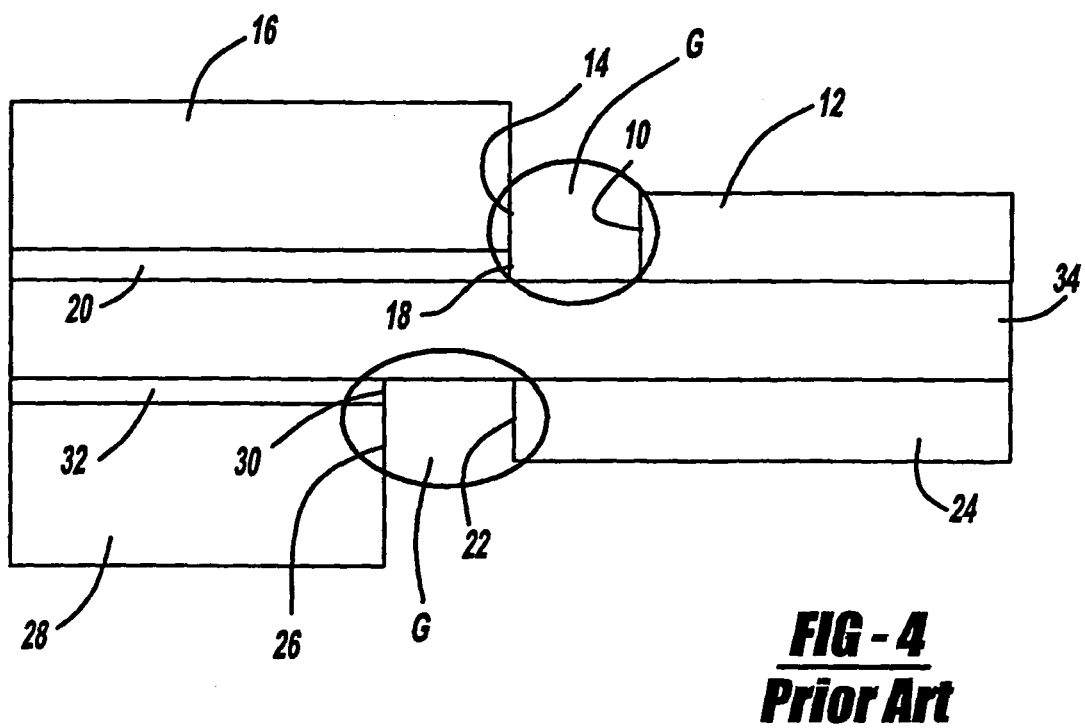
FIG. 4 is a schematic view of a fourth conventional MEA, in accordance with the prior art.
Figure 5:
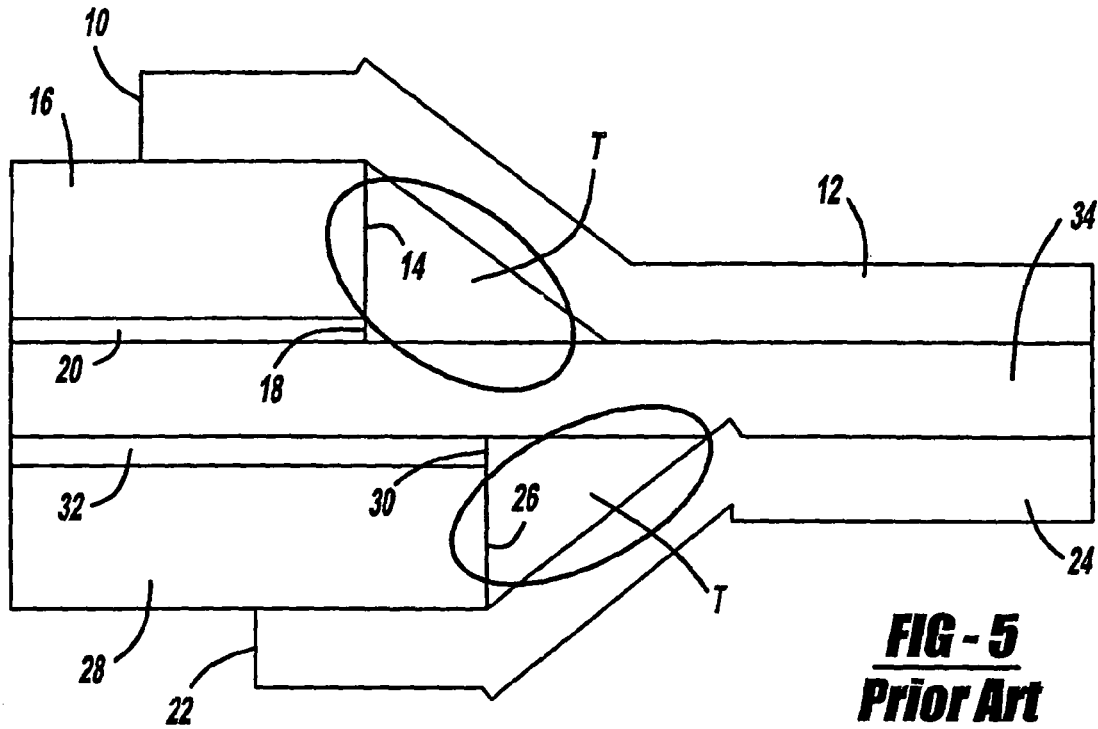
FIG. 5 is a schematic view of the conventional MEA depicted in FIG. 1 or 3 wherein the catalyst layers have tented over the subgaskets, in accordance with the prior art.
Figure 6:
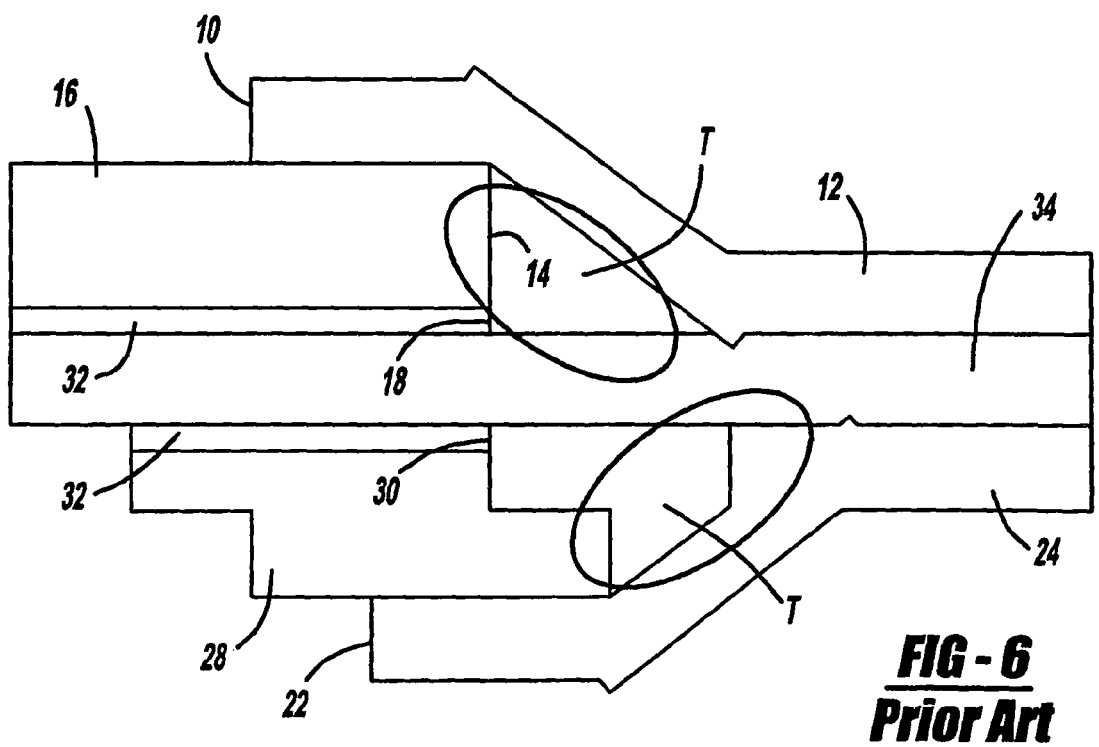
FIG. 6 is a schematic view of the conventional MEA depicted in FIG. 2 or 4 wherein the catalyst layers have tented over the subgaskets, in accordance with the prior art.

The following description of the preferred embodiment(s) is merely exemplary in nature and is in no way intended to limit the invention, its application, or uses.

In accordance with the general teachings of the present invention, improved edge architecture of an MEA includes a catalyst coated membrane with a subgasket comprising an impermeable barrier film and an adhesive. The subgasket can be applied to either the anode catalyst side, yielding a cathode electrode area greater than an anode electrode area, or applied to the cathode catalyst side yielding an anode catalyst area greater than a cathode catalyst area, and/or both the anode electrode area and the cathode electrode area yielding either an anode/cathode catalyst area less than and/or greater than an anode/cathode catalyst area. However, it should be appreciated that the anode and the cathode can be configured so as to be substantially co-terminus (i.e., no or very low degree of overlap) with respect to an edge portion of one another, regardless of how many subgaskets are employed.

Referring to FIG. 7, there is a schematic view of an MEA having a locally greater cathode catalyst layer area than the anode catalyst layer area, wherein a subgasket is overlapping the anode catalyst layer and an adhesive layer is disposed between the subgasket and the anode catalyst layer, in accordance with a first embodiment of the present invention.

More specifically, the MEA, shown generally at 100, primarily includes a membrane layer 102, a cathode catalyst layer 104 adjacent to a surface 102a of the membrane layer 102, an anode catalyst layer 106 adjacent to an other surface 102b of the membrane layer 102, wherein the membrane layer 102 is disposed between the cathode catalyst layer 104 and the anode catalyst layer 106, an adhesive layer 108 adjacent to the other surface 102b of the membrane layer 102, wherein the adhesive layer 108 abuts a surface 106a of the anode catalyst layer 106, and a subgasket layer 110 having an edge portion 112, wherein the subgasket layer 110 is adjacent to a surface 108a of the adhesive layer 108, wherein the adhesive layer 108 is disposed between the subgasket layer 110 and the membrane layer 102, wherein the cathode catalyst layer 104 and anode catalyst layer 106 extend along a length of the membrane layer 102 relative to the edge portion 112 of the subgasket layer 110, wherein the cathode catalyst layer 104 extends a greater length along the length of the membrane layer 102 than the anode catalyst layer 106 relative to the edge portion 112 of the subgasket layer 110. That is, the cathode catalyst layer 104 and the anode catalyst layer 106 are in overlapping, staggered or offset orientation with respect to one another. Additionally, the cathode catalyst layer 104 is longer than the anode catalyst layer 106 as measured from the edge portion 112 of the subgasket layer 110 to an edge portion 114 of the cathode catalyst layer 104. That is, the length of the cathode catalyst layer 104, as measured from the edge portion 112 of the subgasket layer 110 to the edge portion 114 of the cathode catalyst layer 104, is longer than the length of the anode catalyst layer 106, as measured from the edge portion 112 of the subgasket layer 110 to an edge portion 116 of the anode catalyst layer 106.

In accordance with one aspect of the present invention, the distance between the edge portion 112 of the subgasket layer 110 and the edge 114 portion of the cathode catalyst layer 104 is in the range of about 0.1 millimeters to about 5 millimeters. In accordance with another aspect of the present invention, the distance between the edge portion 112 of the subgasket layer 110 and the edge portion 114 of the cathode catalyst layer 104 is in the range of about 1.5 millimeters to about 2.5 millimeters.

In accordance with one aspect of the present invention, a portion of the adhesive layer 108 infiltrates into the anode catalyst layer 106 to form an adhesive infiltration layer 118. The adhesive infiltration layer 118 is disposed between the anode catalyst layer 106 and the subgasket layer 110. In accordance with one aspect of the present invention, the adhesive infiltration layer 118 penetrates into about the upper 10% of the depth of the anode catalyst layer 106.

Referring to FIG. 8, there is shown a schematic view of an MEA having a locally greater anode catalyst layer area than the cathode catalyst layer area, wherein a subgasket is overlapping the anode catalyst layer and an adhesive layer is disposed between the subgasket and the anode catalyst layer, in accordance with a second embodiment of the present invention.

More specifically, the MEA, shown generally at 200, primarily includes a membrane layer 202, a cathode catalyst layer 204 adjacent to a surface 202a of the membrane layer 202, an anode catalyst layer 206 adjacent to an other surface 202b of the membrane layer 202, wherein the membrane layer 202 is disposed between the cathode catalyst layer 204 and the anode catalyst layer 206, an adhesive layer 208 adjacent to the other surface 202b of the membrane layer 202, wherein the adhesive layer 208 abuts a surface 206a of the anode catalyst layer 206, and a subgasket layer 210 having an edge portion 212, wherein the subgasket layer 210 is adjacent to a surface 208a of the adhesive layer 208, wherein the adhesive layer 208 is disposed between the subgasket layer 210 and the membrane layer 202, wherein the cathode catalyst layer 204 and anode catalyst layer 206 extend along a length of the membrane layer 202 relative to the edge portion 212 of the subgasket layer 210, wherein the anode catalyst layer 206 extends a greater length along the length of the membrane layer 202 than the cathode catalyst layer 204 relative to the edge portion 212 of the subgasket layer 210. That is, the cathode catalyst layer 204 and the anode catalyst layer 206 are in overlapping, staggered or offset orientation with respect to one another. Additionally, the anode catalyst layer 206 is longer than the cathode catalyst layer 204 as measured from the edge portion 212 of the subgasket layer 210 to an edge portion 214 of the anode catalyst layer 206. That is, the length of the anode catalyst layer 206, as measured from the edge portion 212 of the subgasket layer 210 to the edge portion 214 of the anode catalyst layer 206, is longer than the length of the cathode catalyst layer 204, as measured from the edge portion 212 of the subgasket layer 210 to an edge portion 216 of the cathode catalyst layer 204.

In accordance with one aspect of the present invention, the distance between the edge portion 212 of the subgasket layer 210 and the edge 214 portion of the anode catalyst layer 206 is in the range of about 0.1 millimeters to about 5 millimeters. In accordance with another aspect of the present invention, the distance between the edge portion 212 of the subgasket layer 210 and the edge portion 214 of the anode catalyst layer 206 is in the range of about 1.5 millimeters to about 2.5 millimeters.

In accordance with one aspect of the present invention, a portion of the adhesive layer 208 infiltrates into the anode catalyst layer 206 to form an adhesive infiltration layer 218. The adhesive infiltration layer 218 is disposed between the anode catalyst layer 206 and the subgasket layer 210. In accordance with one aspect of the present invention, the adhesive infiltration layer 218 penetrates into about the upper 10% of the depth of the anode catalyst layer 206.

Referring to FIG. 9, there is shown a schematic view of an MEA having a locally greater cathode catalyst layer area than the anode catalyst layer area, wherein a subgasket is overlapping the cathode catalyst layer and an adhesive layer is disposed between the subgasket and the cathode catalyst layer, in accordance with a third embodiment of the present invention.

More specifically, the MEA, shown generally at 300, primarily includes a membrane layer 302, an anode catalyst layer 304 adjacent to a surface 302a of the membrane layer 302, a cathode catalyst layer 306 adjacent to an other surface 302b of the membrane layer 302, wherein the membrane layer 302 is disposed between the anode catalyst layer 304 and the cathode catalyst layer 306, an adhesive layer 308 adjacent to the other surface 302b of the membrane layer 302, wherein the adhesive layer 308 abuts a surface 306a of the cathode catalyst layer 306, and a subgasket layer 310 having an edge portion 312, wherein the subgasket layer 310 is adjacent to a surface 308a of the adhesive layer 308, wherein the adhesive layer 308 is disposed between the subgasket layer 310 and the membrane layer 302, wherein the anode catalyst layer 304 and cathode catalyst layer 306 extend along a length of the membrane layer 302 relative to the edge portion 312 of the subgasket layer 310, wherein the cathode catalyst layer 306 extends a greater length along the length of the membrane layer 302 than the anode catalyst layer 304 relative to the edge portion 312 of the subgasket layer 310. That is, the cathode catalyst layer 306 and the anode catalyst layer 304 are in overlapping, staggered or offset orientation with respect to one another. Additionally, the cathode catalyst layer 306 is longer than the anode catalyst layer 304 as measured from the edge portion 312 of the subgasket layer 310 to an edge portion 314 of the cathode catalyst layer 306. That is, the length of the cathode catalyst layer 306, as measured from the edge portion 312 of the subgasket layer 310 to the edge portion 314 of the cathode catalyst layer 306, is longer than the length of the anode catalyst layer 304, as measured from the edge portion 312 of the subgasket layer 310 to an edge portion 316 of the anode catalyst layer 304.

In accordance with one aspect of the present invention, the distance between the edge portion 312 of the subgasket layer 310 and the edge 314 portion of the cathode catalyst layer 306 is in the range of about 0.1 millimeters to about 5 millimeters. In accordance with another aspect of the present invention, the distance between the edge portion 312 of the subgasket layer 310 and the edge portion 314 of the cathode catalyst layer 306 is in the range of about 1.5 millimeters to about 2.5 millimeters.

In accordance with one aspect of the present invention, a portion of the adhesive layer 308 infiltrates into the cathode catalyst layer 306 to form an adhesive infiltration layer 318. The adhesive infiltration layer 318 is disposed between the cathode catalyst layer 306 and the subgasket layer 310. In accordance with one aspect of the present invention, the adhesive infiltration layer 318 penetrates into about the upper 10% of the depth of the cathode catalyst layer 306.

Referring to FIG. 10, there is shown a schematic view of an MEA having a locally greater anode catalyst layer area than the cathode catalyst layer area, wherein a subgasket is overlapping the cathode catalyst layer and an adhesive layer is disposed between the subgasket and the cathode catalyst layer, in accordance with a fourth embodiment of the present invention.

More specifically, the MEA, shown generally at 400, primarily includes a membrane layer 402, an anode catalyst layer 404 adjacent to a surface 402a of the membrane layer 402, a cathode catalyst layer 406 adjacent to an other surface 402b of the membrane layer 402, wherein the membrane layer 402 is disposed between the anode catalyst layer 404 and the cathode catalyst layer 406, an adhesive layer 408 adjacent to the other surface 402b of the membrane layer 402, wherein the adhesive layer 408 abuts a surface 406a of the cathode catalyst layer 406, and a subgasket layer 410 having an edge portion 412, wherein the subgasket layer 410 is adjacent to a surface 408a of the adhesive layer 408, wherein the adhesive layer 408 is disposed between the subgasket layer 410 and the membrane layer 402, wherein the anode catalyst layer 404 and cathode catalyst layer 406 extend along a length of the membrane layer 402 relative to the edge portion 412 of the subgasket layer 410, wherein the anode catalyst layer 404 extends a greater length along the length of the membrane layer 402 than the cathode catalyst layer 406 relative to the edge portion 412 of the subgasket layer 410. That is, the anode catalyst layer 404 and the cathode catalyst layer 406 are in overlapping, staggered or offset orientation with respect to one another. Additionally, the anode catalyst layer 404 is longer than the cathode catalyst layer 406 as measured from the edge portion 412 of the subgasket layer 410 to an edge portion 414 of the anode catalyst layer 404. That is, the length of the anode catalyst layer 404, as measured from the edge portion 412 of the subgasket layer 410 to the edge portion 414 of the anode catalyst layer 404, is longer than the length of the cathode catalyst layer 406, as measured from the edge portion 412 of the subgasket layer 410 to an edge portion 416 of the cathode catalyst layer 406.

In accordance with one aspect of the present invention, the distance between the edge portion 412 of the subgasket layer 410 and the edge 414 portion of the anode catalyst layer 404 is in the range of about 0.1 millimeters to about 5 millimeters. In accordance with another aspect of the present invention, the distance between the edge portion 412 of the subgasket layer 410 and the edge portion 414 of the anode catalyst layer 404 is in the range of about 1.5 millimeters to about 2.5 millimeters.

In accordance with one aspect of the present invention, a portion of the adhesive layer 408 infiltrates into the cathode catalyst layer 406 to form an adhesive infiltration layer 418. The adhesive infiltration layer 418 is disposed between the cathode catalyst layer 406 and the subgasket layer 410. In accordance with one aspect of the present invention, the adhesive infiltration layer 418 penetrates into about the upper 10% of the depth of the cathode catalyst layer 406.

With respect to the aforementioned embodiments, the subgasket layers are comprised of a material selected from the group consisting of polyesters, polyethylenes, polyimides, and combinations thereof. By way of a non-limiting example, the subgasket layer 108 can be comprised of MYLAR® (e.g., biaxially-oriented polyethylene terephthalate (BOPET) polyester film) or PET (i.e., polyethylene terephthalate) as the impermeable barrier film. However, it should be appreciated that other materials can be employed as well, such as but not limited to PEN (i.e., polyethylene 2,6-naphthalenedicarboxylate), KAPTON® (i.e., polyimide film), other polyester films, and/or the like. In accordance with one aspect of the present invention, the edge architecture includes either PET or PEN due to a five-fold and ten-fold reduction in gas permeability respectively compared to polyimide film. In addition, moisture adsorption is reduced by three-fold and four-fold for PET and PEN, respectively, compared to polyimide film. These thickness ranges give some rigidity to the edge of the five layer MEA assembly (known generally as MEA5) which is required for high volume manufacturing operations, but yet is thin enough for the high power density requirements required by current automotive applications.

With respect to the aforementioned embodiments, the subgasket layers have a thickness of about 100 μm or greater. In accordance with another aspect of the present invention, the subgasket layers have a thickness in the range of about 6 μm to about 100 μm. In accordance with still another aspect of the present invention, the subgasket layers have a thickness in the range of about 12 μm to about 50 μm.

With respect to the aforementioned embodiments, the adhesive of the adhesive layers can include, without limitation, pressure sensitive adhesives (PSA), hot melt adhesives and/or the like. PSA's can include, without limitation, acrylic or silicone based adhesives. Hot melt adhesives can include, without limitation, poly vinyl acetate or ethyl vinyl acetate/polyethylene blends. In accordance with one aspect of the present invention, the edge architecture of the MEA includes the use of PSA because the PSA can be applied to the catalyst coated membrane at room temperature which has no impact on membrane durability.

With respect to the aforementioned embodiments, the adhesive layers have has a thickness of about 50 μm or greater. In accordance with another aspect of the present invention, the adhesive layers have a thickness in the range of about 6 μm to about 50 μm. In accordance with still another aspect of the present invention, the adhesive layers have has a thickness is in the range of about 8 μm to about 25 μm.

Without being bound to a particular theory of the operation of the present invention, these ranges yield a continuous adhesive film with no adhesive voids and allows for the adhesive to flow at the catalyst layer edge thereby providing a gas tight seal between the catalyst edge and the membrane. Without being bound to a particular theory of the operation of the present invention, this gas tight seal minimizes direct gas access to the membrane and subsequent free radical formation leading to accelerated local chemical degradation.

With respect to the aforementioned embodiments, the durability of the whole MEA is improved by two to three times as compared to conventional MEA configurations. Typically, application of the subgasket layer (i.e., impermeable barrier film)/adhesive to the cathode side yields an approximate two-fold MEA durability increase and application of the subgasket layer (i.e., impermeable barrier film)/adhesive to the anode side yields an approximate three-fold MEA durability increase.

Without being bound to a particular theory of the operation of the present invention, there are several benefits that can be realized by employing the present invention, such as but not limited to: (1) adhering the subgasket layer to the membrane layer with adhesive provides a more rigid part for easier handling in high volume manufacturing operations; (2) the subgasket layer (i.e., impermeable gas barrier film) defines a consistent edge architecture configuration, e.g., either cathode>anode or anode>cathode, regardless of the local electrode overlap which leads to improved overall membrane durability; (3) the adhesive film (i.e., adhesive infiltration layer) between the subgasket layer (i.e., impermeable gas barrier film) and the catalyst layer (i.e., electrode) edge minimizes direct gas access to the membrane layer, subsequent free radical formation and accelerated local chemical degradation in comparison to a loose laid barrier film laid along the edge of the catalyst coated membrane; (4) in the event that local polymer membrane chemical degradation is occurring in the region between the anode catalyst edge and cathode catalyst edge, the subgasket layer/adhesive layer will prevent gas crossover thereby improving overall membrane durability.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A membrane electrode assembly, comprising:
a membrane layer;
a cathode catalyst layer adjacent to a surface of the membrane layer;
an anode catalyst layer adjacent to an other surface of the membrane layer, wherein the membrane layer is disposed between the cathode catalyst layer and the anode catalyst layer;
an adhesive layer adjacent to the other surface of the membrane layer, wherein the adhesive layer abuts a surface of the anode catalyst layer,
wherein a portion of the adhesive layer infiltrates into the anode catalyst layer to form an adhesive infiltration layer; and
a subgasket layer having an edge portion, wherein the subgasket layer is adjacent to a surface of the adhesive layer, wherein the adhesive layer is disposed between the subgasket layer and the membrane layer and the subgasket layer extends over and is adjacent to a planar surface of a portion of the anode catalyst layer;
wherein the cathode catalyst layer and anode catalyst layer extend along a length of the membrane layer relative to the edge portion of the subgasket layer, wherein the cathode catalyst layer extends a greater length along the length of the membrane layer than the anode catalyst layer relative to the edge portion of the subgasket layer, and wherein the adhesive infiltration layer is disposed between the anode catalyst layer and the subgasket layer.

2. The membrane electrode assembly according to claim 1, wherein the subgasket layer is comprised of a material selected from the group consisting of polyesters, polyethylenes, polyimides, and combinations thereof.

3. The membrane electrode assembly according to claim 1, wherein the distance between the edge portion of the subgasket layer and an edge portion of the cathode catalyst layer is in the range of about 0.1 millimeters to about 5 millimeters.

4. The membrane electrode assembly according to claim 1, wherein the distance between the edge portion of the subgasket layer and an edge portion of the cathode catalyst layer is in the range of about 1.5 millimeters to about 2.5 millimeters.

5. A membrane electrode assembly, comprising:
a membrane layer;
a cathode catalyst layer adjacent to a surface of the membrane layer;
an anode catalyst layer adjacent to an other surface of the membrane layer, wherein the membrane layer is disposed between the cathode catalyst layer and the anode catalyst layer;
an adhesive layer adjacent to the other surface of the membrane layer, wherein the adhesive layer abuts a surface of the anode catalyst layer, wherein a portion of the adhesive layer infiltrates into the anode catalyst layer to form an adhesive infiltration layer; and a subgasket layer having an edge portion, wherein the subgasket layer is adjacent to a surface of the adhesive layer, wherein the adhesive layer is disposed between the subgasket layer and the membrane layer and the subgasket layer extends over and is adjacent to a planar surface of a portion of the anode catalyst layer;

wherein the cathode catalyst layer and anode catalyst layer extend along a length of the membrane layer relative to the edge portion of the subgasket layer, wherein the anode catalyst layer extends a greater length along the length of the membrane layer than the cathode catalyst layer relative to the edge portion of the subgasket layer, and wherein the adhesive infiltration layer is disposed between the anode catalyst layer and the subgasket layer.

6. The membrane electrode assembly according to claim 5, wherein the subgasket layer is comprised of a material selected from the group consisting of polyesters, polyethylenes, polyimides, and combinations thereof.

7. The membrane electrode assembly according to claim 5, wherein the distance between the edge portion of the subgasket layer and an edge portion of the anode catalyst layer is in the range of about 0.1 millimeters to about 5 millimeters.

8. The membrane electrode assembly according to claim 5, wherein the distance between the edge portion of the subgasket layer and an edge portion of the anode catalyst layer is in the range of about 1.5 millimeters to about 2.5 millimeters.

9. A membrane electrode assembly, comprising:
a membrane layer;
an anode catalyst layer adjacent to a surface of the membrane layer;
a cathode catalyst layer adjacent to an other surface of the membrane layer, wherein the membrane layer is disposed between the cathode catalyst layer and the anode catalyst layer;
an adhesive layer adjacent to the other surface of the membrane layer, wherein the adhesive layer abuts a surface of the cathode catalyst layer,
wherein a portion of the adhesive layer infiltrates into the cathode catalyst layer to form an adhesive infiltration layer; and
a subgasket layer having an edge portion, wherein the subgasket layer is adjacent to a surface of the adhesive layer, wherein the adhesive layer is disposed between the subgasket layer and the membrane layer and the subgasket layer extends over and is adjacent to a planar surface of a portion of the cathode catalyst layer;
wherein the cathode catalyst layer and anode catalyst layer extend along a length of the membrane layer relative to the edge portion of the subgasket layer, wherein the cathode catalyst layer extends a greater length along the length of the membrane layer than the anode catalyst layer relative to the edge portion of the subgasket layer, and wherein the adhesive infiltration layer is disposed between the cathode catalyst layer and the subgasket layer.

10. The membrane electrode assembly according to claim 9, wherein the subgasket layer is comprised of a material selected from the group consisting of polyesters, polyethylenes, polyimides, and combinations thereof.

11. The membrane electrode assembly according to claim 9, wherein the distance between the edge portion of the subgasket layer and an edge portion of the cathode catalyst layer is in the range of about 0.1 millimeters to about 5 millimeters.

12. The membrane electrode assembly according to claim 9, wherein the distance between the edge portion of the subgasket layer and an edge portion of the cathode catalyst layer is in the range of about 1.5 millimeters to about 2.5 millimeters.

13. A membrane electrode assembly, comprising:
a membrane layer;
an anode catalyst layer adjacent to a surface of the membrane layer;
a cathode catalyst layer adjacent to an other surface of the membrane layer, wherein the membrane layer is disposed between the cathode catalyst layer and the anode catalyst layer;
an adhesive layer adjacent to the other surface of the membrane layer, wherein the adhesive layer abuts a surface of the cathode catalyst layer,
wherein a portion of the adhesive layer infiltrates into the cathode catalyst layer to form an adhesive infiltration layer; and
a subgasket layer having an edge portion, wherein the subgasket layer is adjacent to a surface of the adhesive layer, wherein the adhesive layer is disposed between the subgasket layer and the membrane layer and the subgasket layer extends over and is adjacent to a planar surface of a portion of the cathode catalyst layer;
wherein the cathode catalyst layer and anode catalyst layer extend along a length of the membrane layer relative to the edge portion of the subgasket layer, wherein the anode catalyst layer extends a greater length along the length of the membrane layer than the cathode catalyst layer relative to the edge portion of the subgasket layer, and wherein the adhesive infiltration layer is disposed between the cathode catalyst layer and the subgasket layer.

14. The membrane electrode assembly according to claim 13, wherein the subgasket layer is comprised of a material selected from the group consisting of polyesters, polyethylenes, polyimides, and combinations thereof.

15. The membrane electrode assembly according to claim 13, wherein the distance between the edge portion of the subgasket layer and an edge portion of the anode catalyst layer is in the range of about 0.1 millimeters to about 5 millimeters.

16. The membrane electrode assembly according to claim 13, wherein the distance between the edge portion of the subgasket layer and an edge portion of the anode catalyst layer is in the range of about 1.5 millimeters to about 2.5 millimeters.

* * * * *